US009739072B1

(12) United States Patent
Melland

(10) Patent No.: US 9,739,072 B1
(45) Date of Patent: Aug. 22, 2017

(54) TELESCOPING VEHICULAR AWNING APPARATUS WITH ENHANCED DURABILITY AND STORAGE ABILITY

(71) Applicant: Lane Richard Melland, Placentia, CA (US)

(72) Inventor: Lane Richard Melland, Placentia, CA (US)

(*) Notice: Subject to any disclaimer, the term of this patent is extended or adjusted under 35 U.S.C. 154(b) by 0 days.

(21) Appl. No.: 15/068,344

(22) Filed: Mar. 11, 2016

Related U.S. Application Data

(60) Provisional application No. 62/133,620, filed on Mar. 16, 2015.

(51) Int. Cl.
*E04H 15/08* (2006.01)
*B60R 11/00* (2006.01)

(52) U.S. Cl.
CPC ............. *E04H 15/08* (2013.01); *B60R 11/00* (2013.01); *B60R 2011/004* (2013.01)

(58) Field of Classification Search
CPC ......... E04H 15/08; E04H 15/06; E04H 15/02; E04H 15/38; E04H 15/46; E04H 15/58; B60R 7/04; B60R 2011/0028; B60R 3/02; B60R 11/00; B60R 2011/004
USPC ........... 135/88.07, 88.13–88.16, 96, 90, 117, 135/88.1; 296/158, 160, 163, 172–173, 296/175–176, 37.7, 95.1
See application file for complete search history.

(56) References Cited

U.S. PATENT DOCUMENTS

| | | | | |
|---|---|---|---|---|
| 2,847,018 A | * | 8/1958 | Weninger | E04H 15/06 135/117 |
| 2,870,774 A | * | 1/1959 | Blosser | E04H 15/06 135/88.14 |
| 3,088,475 A | * | 5/1963 | Muhr | B60P 3/38 135/117 |
| 3,707,977 A | * | 1/1973 | Grady | B60P 3/343 135/139 |
| 3,957,301 A | * | 5/1976 | Huber | B60J 11/00 135/87 |
| 4,010,973 A | * | 3/1977 | Heinrich | E04H 15/08 135/88.1 |
| 4,457,553 A | * | 7/1984 | Larkin | B60R 15/00 135/114 |
| 4,754,774 A | * | 7/1988 | Leader | E04H 15/06 135/120.2 |
| 4,932,622 A | * | 6/1990 | Hayakawa | F16B 7/1454 248/188.5 |

(Continued)

*Primary Examiner* — Winnie Yip
(74) *Attorney, Agent, or Firm* — Plager Schack LLP

(57) ABSTRACT

A retractable awning apparatus for use with a vehicle with enhanced durability and storage ability is secured to an existing vehicle's roof rack. The awning apparatus includes a plurality of telescoping arms coupled to the roof rack, each telescoping arm having an outer tubular member coupled to the roof rack and an inner tubular member slidably mounted to the outer tubular member, each inner tubular member designed to slidably adjust to an extended position into a side area of the vehicle or a retracted position within the outer tubular member, a support bar coupled to exposed ends of the inner tubular members of the telescoping arms, and a canopy detachably coupled to the support bar, vehicle's roof rack and at least one of the telescoping arms when in the extended position, thereby securing the canopy in place over the side area of the vehicle.

9 Claims, 4 Drawing Sheets

(56) References Cited

U.S. PATENT DOCUMENTS

| | | | |
|---|---|---|---|
| 5,400,813 A * | 3/1995 | Swan, Jr. | E04H 15/08 |
| | | | 135/119 |
| 5,592,982 A * | 1/1997 | Murray | B60P 3/343 |
| | | | 135/88.12 |
| 5,884,824 A * | 3/1999 | Spring, Jr. | B60R 9/042 |
| | | | 224/309 |
| 6,782,936 B1 | 8/2004 | Girard | |
| 6,796,359 B1 * | 9/2004 | Knutson | E04F 10/04 |
| | | | 135/88.12 |
| 8,387,639 B2 | 3/2013 | Troxel | |
| 8,607,845 B2 | 12/2013 | Wu | |
| 8,752,606 B2 | 6/2014 | Albrecht | |
| 8,839,839 B2 | 9/2014 | Prine, Sr. | |
| 8,876,189 B1 | 11/2014 | Williams | |

* cited by examiner

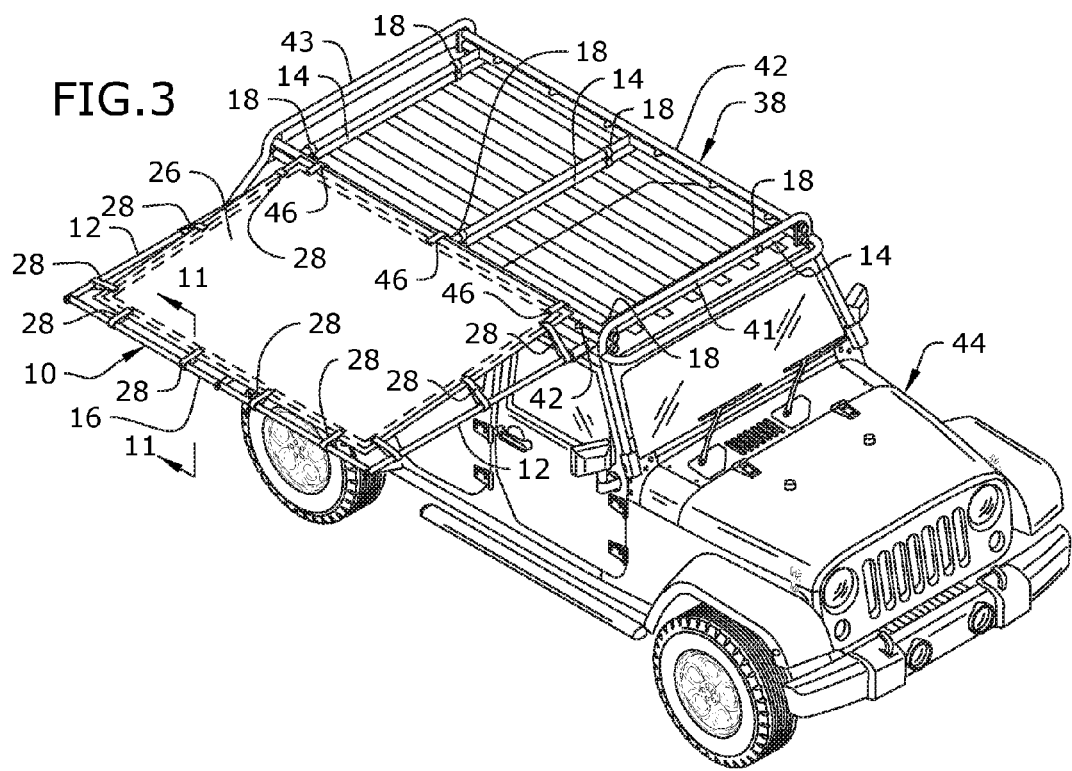
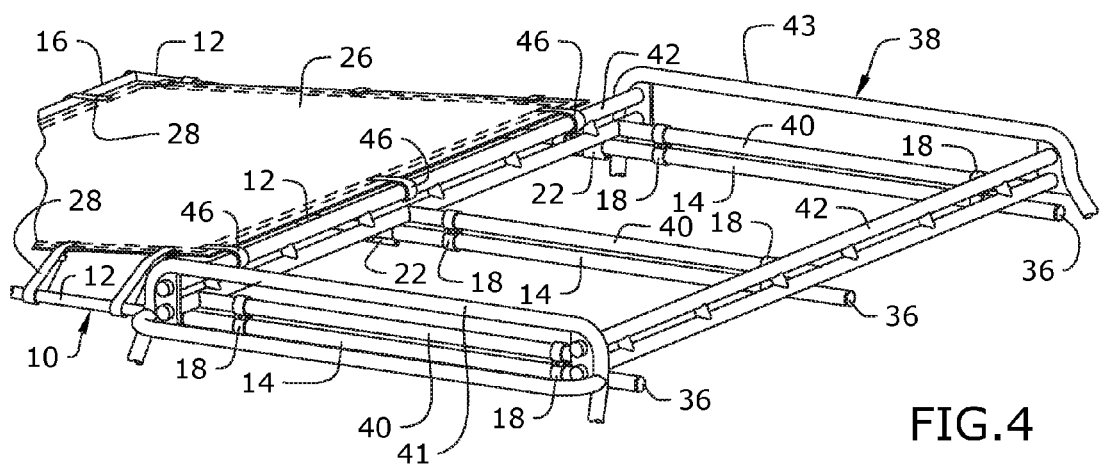

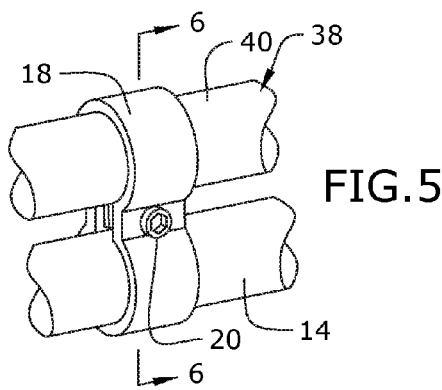
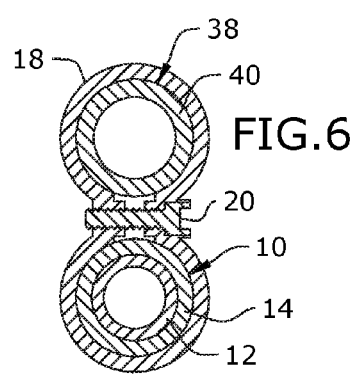
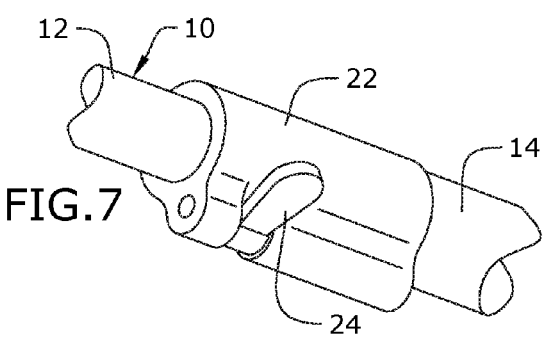
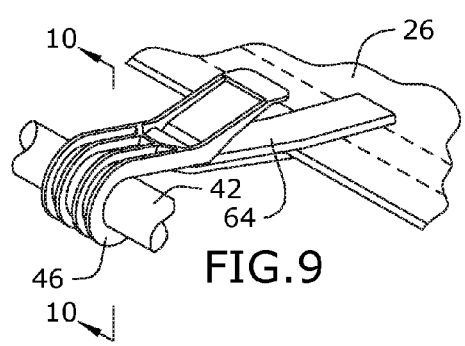
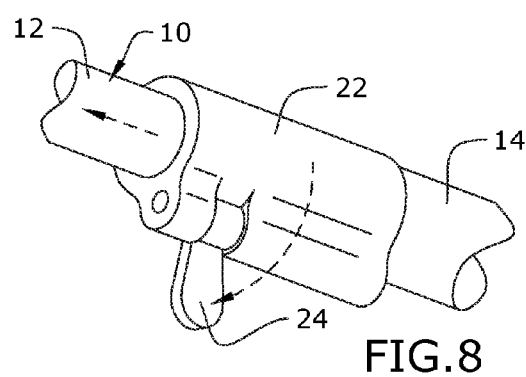
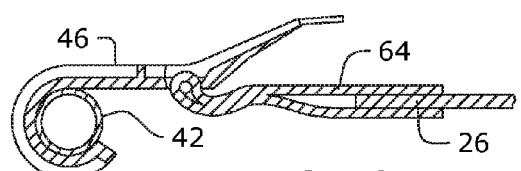
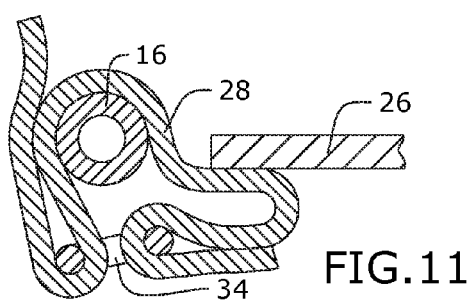

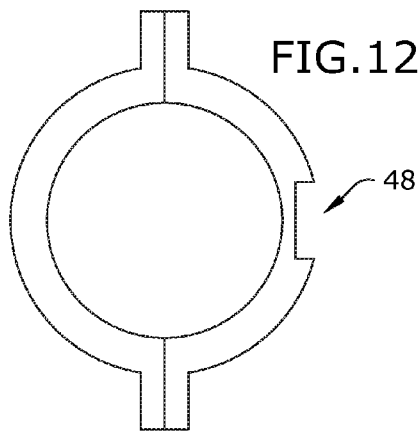
FIG.12
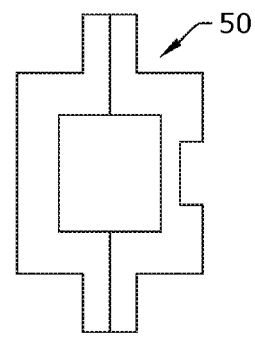
FIG.13
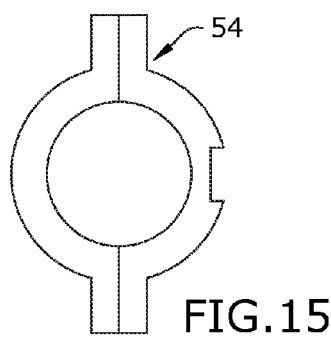
FIG.15
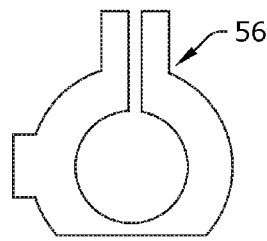
FIG.14
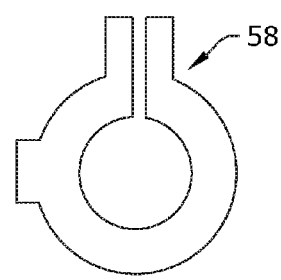
FIG.17
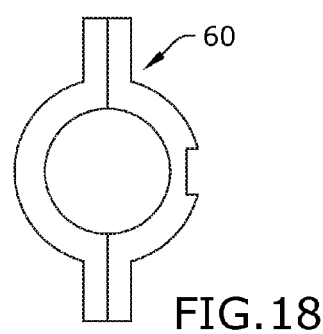
FIG.18
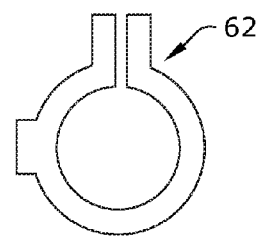
FIG.16
FIG.19

TELESCOPING VEHICULAR AWNING APPARATUS WITH ENHANCED DURABILITY AND STORAGE ABILITY

RELATED APPLICATION

The application claims priority to provisional patent application U.S. Ser. No. 62/133,620 filed on Mar. 16, 2015, the entire contents of which is herein incorporated by reference.

BACKGROUND

The embodiments herein relate generally to awning devices for use with vehicles.

Vehicles are often driven to locations where individuals desire protection from the sun, rain, snow, dust or other environmental elements. In these outdoor environments, awnings or canopies are typically assembled and secured to the vehicle to protect users from these environmental elements. Several awning devices are disclosed in U.S. Pat. Nos. 8,876,189, 8,839,839, 8,752,606, 8,607,845, 8,387,639 and 6,782,936. However, these awning devices are limited because they either comprise bulky components, additional moving components such as support legs that require an adjustment to contact the ground, or complicated components such as motors, gears or rollers to operate, which are subject to premature wear and/or high maintenance or operating costs. In addition, these awning devices do not efficiently disassemble to store the components.

As such, there is a need in the industry for a retractable vehicular awning apparatus with enhanced durability and storage ability, which overcomes the limitations of the prior art.

SUMMARY

A retractable awning apparatus for use with a vehicle with enhanced durability and storage ability is provided. The awning apparatus is configured to be secured to an existing roof rack of the vehicle to permit an extension or compression of an awning of the apparatus over a side area of the vehicle. The roof rack comprises a front bar coupled to a front edge of a roof of the vehicle, a rear bar coupled to a rear edge of the roof, a pair of side bar assemblies coupled to both the front and rear bars and extending along side edges of the roof, and a plurality of crossing bars coupled to the pair of side bar assemblies. The awning apparatus comprises a plurality of telescoping arms coupled to the roof rack and oriented substantially perpendicular to a longitudinal axis of the vehicle, each telescoping arm of the plurality of telescoping arms comprising an outer tubular member coupled to the roof rack and an inner tubular member slidably mounted to the outer tubular member, each inner tubular member of the plurality of telescoping arms configured to slidably adjust to an extended position into the side area of the vehicle or a retracted position within the outer tubular member, a support bar coupled to exposed ends of the inner tubular members of the plurality of telescoping arms, and a canopy detachably coupled to the support bar, roof rack of the vehicle and at least one of the plurality of telescoping arms when in the extended position, thereby securing the canopy in place over the side area of the vehicle.

BRIEF DESCRIPTION OF THE FIGURES

The detailed description of some embodiments of the invention will be made below with reference to the accompanying figures, wherein the figures disclose one or more embodiments of the present invention.

FIG. 3 depicts a perspective view of certain embodiments of the awning apparatus in an extended configuration with canopy cover 26;

FIG. 4 depicts a perspective view of certain embodiments of the awning apparatus shown in use while omitting vehicle 44 for illustrative clarity;

FIG. 5 depicts a perspective view of certain embodiments of the awning apparatus;

FIG. 6 depicts a section view of certain embodiments of the awning apparatus taken along line 6-6 in FIG. 5;

FIG. 7 depicts a perspective view of certain embodiments of the awning apparatus illustrating snap collar 22 in a locked configuration;

FIG. 8 depicts a perspective view of certain embodiments of the awning apparatus illustrating snap collar 22 in an unlocked configuration;

FIG. 9 depicts a perspective view of certain embodiments of the awning apparatus;

FIG. 10 depicts a section view of certain embodiments of the awning apparatus taken along line 10-10 in FIG. 9;

FIG. 11 depicts a section view of certain embodiments of the awning apparatus taken along line 11-11 in FIG. 3;

FIG. 12 depicts a profile view of an alternate embodiment of the awning apparatus;

FIG. 13 depicts a profile view of an alternate embodiment of the awning apparatus;

FIG. 14 depicts a profile view of an alternate embodiment of the awning apparatus;

FIG. 15 depicts a profile view of an alternate embodiment of the awning apparatus;

FIG. 16 depicts a profile view of an alternate embodiment of the awning apparatus;

FIG. 17 depicts a profile view of an alternate embodiment of the awning apparatus;

FIG. 18 depicts a profile view of an alternate embodiment of the awning apparatus; and FIG. 19 depicts a profile view of an alternate embodiment of the awning apparatus.

DETAILED DESCRIPTION OF CERTAIN EMBODIMENTS

Figure 1:
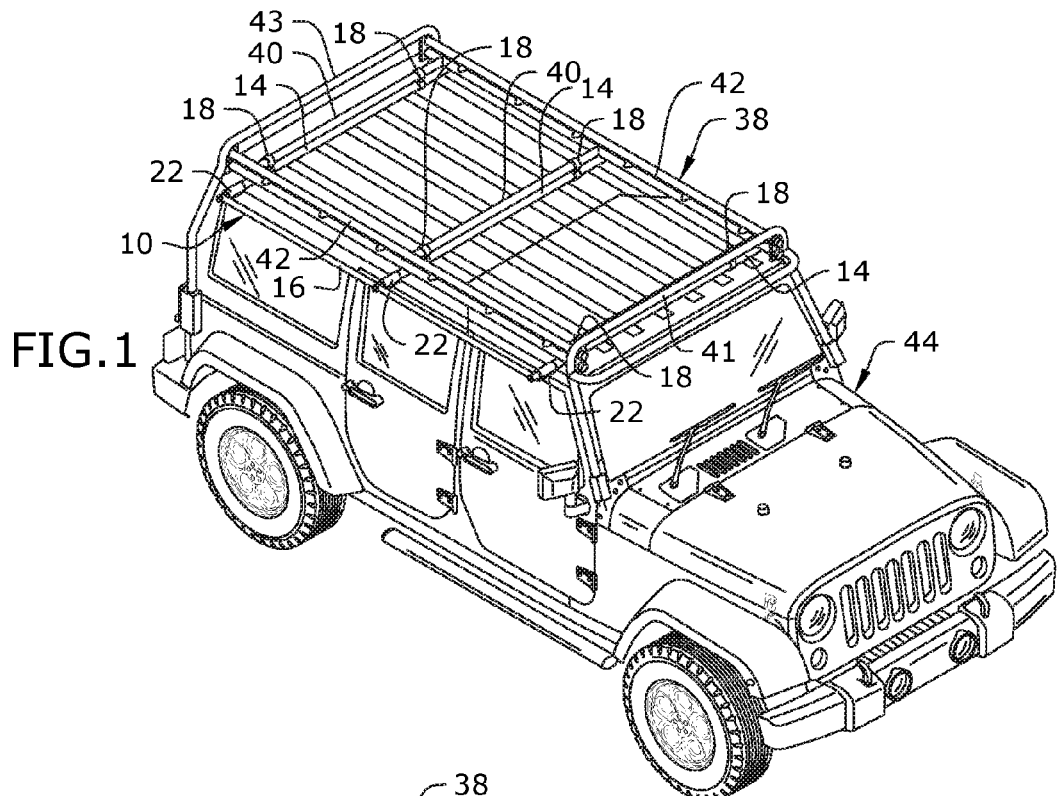
FIG. 1 depicts a perspective view of certain embodiments of the awning apparatus in a retracted configuration.
Figure 2:
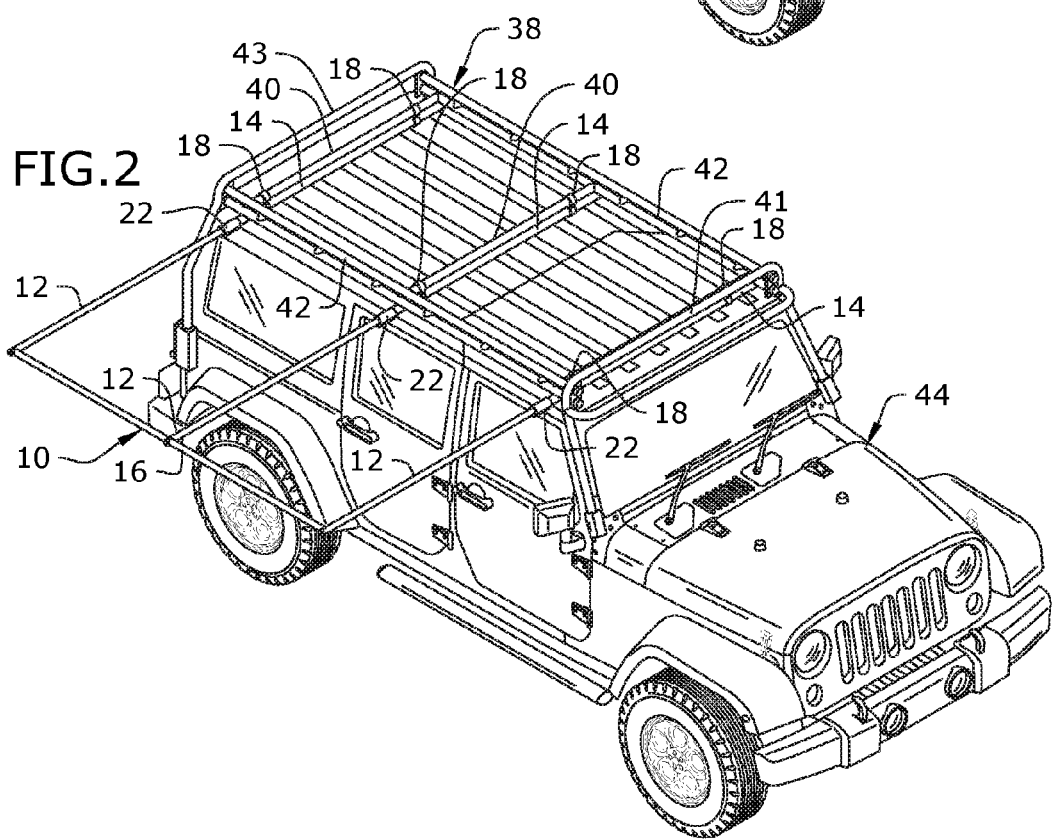
FIG. 2 depicts a perspective view of certain embodiments of the awning apparatus in an extended configuration without canopy cover 26.

As depicted in FIGS. 1-3, retractable awning apparatus 10 is configured to be secured to an existing roof rack 38 of vehicle 44. In one embodiment, roof rack 38 comprises front bar 41 coupled to a front edge of the roof, rear bar 43 coupled to a rear edge of the roof, side bar assemblies 42 coupled to front bar 41 and rear bar 43, and crossing bars 40 coupled to both side bar assemblies 42. Each side bar assembly 42 of roof rack 38 may comprise two bar members, which extend along a side edge of the roof. It shall be appreciated that components of roof rack 38 may be welded or bolted together prior to being fastened to the roof of vehicle 44.

Retractable awning apparatus 10 generally comprises a plurality of telescoping members including inner tubular members 12 slidably mounted to the interior of outer tubular members 14, and exterior support bar 16 coupled to inner tubular members 12 by a weld or mechanical fasteners. As depicted in FIG. 1, inner tubular members 12 are retracted within outer tubular members 14 in a compact configuration. As depicted in FIG. 2, inner tubular members 12 are slidably adjusted relative to outer tubular members 14 to an extended configuration. As depicted in FIG. 3, canopy cover 26 is detachably coupled to a pair of inner tubular members 12 and exterior support bar 16 by canopy cover straps 28.

In a preferred embodiment, each telescoping member and exterior support bar 16 may be made from materials including, but not limited to, aluminum, steel, fiberglass, carbon fiber, or the like. In addition, each member may have any shaped cross-section including, but not limited to, a circle or square. Canopy cover 26 is preferably made from a water-resistant material. In certain embodiments, canopy cover 26 may also block ultra-violet rays.

As depicted in FIG. 4, each outer tubular member 14 of the telescoping arms is coupled to one of the plurality of crossing bars 40 of roof rack 38 by mounting brackets 18. The end of each outer tubular member 14 is sealed with pipe end cap 36. As depicted in FIGS. 5-6, each mounting bracket 18 comprises a top opening configured to receive crossing bar 40 and a bottom opening configured to receive outer tubular member 14. Once crossing bar 40 and outer tubular member 14 are disposed within the openings of mounting bracket 18, the components are tightened by fastener 20. Fastener 20 may be any component such as a bolt or screw. Mounting bracket 18 may be made from any materials such as steel, aluminum, other known materials, or the like. Although the figures depict 3 telescoping members, it shall be appreciated that any alternative number of telescoping members may be used instead depending on the type and configuration of roof rack 38.

As depicted in FIGS. 7-8, each telescoping member comprises snap collar 22 coupled thereto. Snap collar 22 comprises handle 24, which may be pivotably adjusted to a locked or unlocked position. FIG. 7 depicts handle 24 of snap collar 22 in a locked position. In the locked position, inner tubular member 12 is locked to outer tubular member 14 in a stationary configuration. This is ideal when retractable awning apparatus 10 is in the extended or retracted configurations. FIG. 8 depicts handle 24 of snap collar 22 in an unlocked position. In the unlocked position, inner tubular member 12 can slidably adjust relative to outer tubular member 14. This is ideal for when retractable awning apparatus 10 is being adjusted between the extended or retracted configurations.

As depicted in FIG. 4, a side edge of canopy cover 26 is secured to side bar assembly 42 of roof rack 38 by hooks 46. This side edge of canopy cover 26 comprises a plurality of webbing straps 64 coupled thereto. As depicted in FIGS. 9-10, each webbing strap 64 comprises a bottom portion sewn to a bottom portion of canopy cover 26 and a top portion adjustably coupled to the top portion of canopy cover 26. An end of webbing strap 64 is looped around a bar member of hook 46 and secured in place. Hook 46 permits webbing strap 64 to be adjusted as needed to generate a desired tension in canopy cover 26 when coupled to the telescoping arms and exterior support bar 16.

As depicted in FIG. 3, the remaining edges of canopy cover 26 are secured to exterior support bar 16 and a pair of inner tubular members 12 by a plurality of canopy cover straps 28, which are sewn to canopy cover 26. FIG. 11 depicts the coupling of each canopy cover strap 28 to exterior support bar 16. In a preferred embodiment, canopy cover strap 28 comprises portions with hook fasteners and portions with loop fasteners. The hook portions and loop portions may be disposed on the same side of canopy cover strap 28. Alternatively, the hook portions and loop portions may be disposed on opposite sides of canopy cover strap 28. Each canopy cover strap 28 is disposed around exterior support bar 16, through buckle 34, and secured to itself by engaging hook portions with loop portions on canopy cover strap 28. Canopy cover straps 28 on other edges of canopy cover 26 are secured to inner tubular members 12 in the same manner.

As depicted in FIG. 3, retractable awning apparatus 10 in the fully assembled configuration provides a shaded area below canopy cover 26 on the side of vehicle 44. Canopy cover straps 28 and hooks 46 generate sufficient tension throughout canopy cover 26 to permit the cover to remain in place and withstand environmental elements such as wind, rain, snow, sleet, other precipitation, or the like. Canopy cover 26 can be easily detached by unfastening canopy cover straps 28 and hooks 46. When not in use, inner tubular members 12 are retracted within outer tubular members 14 as shown in FIG. 1.

In alternative embodiments, mounting brackets 18 may be replaced with other shaped and sized mounting brackets to accommodate different types and configurations of roof racks 38. FIG. 12 depicts first alternate roof rack bracket mount 48. FIG. 13 depicts second alternate roof rack bracket mount 50. FIG. 14 depicts third alternate roof rack bracket mount 52. FIG. 15 depicts fourth alternate roof rack bracket mount 54. FIG. 18 depicts fifth alternate roof rack bracket mount 60.

FIG. 16 depicts first alternate outer tubular member fastener 56. FIG. 17 depicts second alternate outer tubular member fastener 58. FIG. 19 depicts third alternate outer tubular member fastener 62. Each alternate roof rack bracket mount 48, 50, 52, 54, 60 comprises a female component configured to receive a male component of any alternate outer tubular member fastener 56, 58, 62.

It shall be appreciated that the components of retractable awning apparatus 10 described in several embodiments herein may comprise any alternative known materials in the field and be of any color, size and/or dimensions. It shall be appreciated that the components of retractable awning apparatus 10 described herein may be manufactured and assembled using any known techniques in the field.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A retractable awning apparatus for use with a vehicle with enhanced durability and storage ability, the awning apparatus configured to be secured to an existing roof rack of the vehicle to permit an extension or compression of an awning of the apparatus over a side area of the vehicle, the roof rack comprising a front bar coupled to a front edge of a roof of the vehicle, a rear bar coupled to a rear edge of the roof, a pair of side bar assemblies coupled to both the front and rear bars and extending along side edges of the roof, and a plurality of crossing bars coupled to the pair of side bar assemblies, the awning apparatus comprising:
   a plurality of telescoping arms coupled to the roof rack by a plurality of mounting brackets and oriented substantially perpendicular to a longitudinal axis of the vehicle, each telescoping arm of the plurality of telescoping arms comprising an outer tubular member coupled to the roof rack and an inner tubular member slidably mounted to the outer tubular member, each inner tubular member of the plurality of telescoping arms configured to slidably adjust to an extended position into the side area of the vehicle or a retracted position within the outer tubular member, each mounting bracket in the plurality of mounting brackets comprising an upper opening configured to receive one of the plurality of crossing bars therethrough and a bottom opening configured to receive one of the outer tubular members of the plurality of telescoping arms therethrough;

a support bar coupled to exposed ends of the inner tubular members of the plurality of telescoping arms; and a canopy detachably coupled to the support bar, roof rack of the vehicle and at least one of the plurality of telescoping arms when in the extended position, thereby securing the canopy in place over the side area of the vehicle.

2. The retractable awning apparatus of claim 1, wherein each telescoping arm of the plurality of telescoping arms comprises a snap collar configured to lock the inner tubular member in a desired position relative to the outer tubular member.

3. The retractable awning apparatus of claim 2, wherein the plurality of telescoping arms comprises a first telescoping arm situated proximate the front edge of the roof, a second telescoping arm situated in an intermediate portion of the roof, and a third telescoping arm situated proximate the rear edge of the roof.

4. The retractable awning apparatus of claim 3, wherein the canopy is a generally rectangular member comprising a top edge, a bottom edge opposite the top edge, and a pair of side edges coupled to the top and bottom edges, wherein the top edge is coupled to the inner tubular member of the first telescoping arm, the bottom edge is coupled to the inner tubular member of the third telescoping arm, the first side edge is coupled to the support bar, and the second side edge is coupled to one of the pair of side bar assemblies of the roof rack.

5. The retractable awning apparatus of claim 4, further comprising a plurality of support straps coupled to each of the top edge, first side edge and rear edge of the canopy, wherein each support strap of the plurality of support straps is disposed around one of the inner tubular members or support bar and secured in place by a buckle coupled thereto.

6. The retractable awning apparatus of claim 5, further comprising a plurality of webbing straps coupled to the second side edge of the canopy.

7. The retractable awning apparatus of claim 6, further comprising a plurality of hooks coupled to the plurality of webbing straps of the canopy and one of the side bar assemblies of the roof rack.

8. The retractable awning apparatus of claim 7, wherein the plurality of hooks and the plurality of support straps are configured to generate sufficient tension throughout the canopy to secure the canopy in place.

9. A retractable awning apparatus for use with a vehicle with enhanced durability and storage ability, the awning apparatus configured to be secured to an existing roof rack of the vehicle to permit an extension or compression of an awning of the apparatus over a side area of the vehicle, the roof rack comprising a front bar coupled to a front edge of a roof of the vehicle, a rear bar coupled to a rear edge of the roof, a pair of side bar assemblies coupled to both the front and rear bars and extending along side edges of the roof, and a plurality of crossing bars coupled to the pair of side bar assemblies, the awning apparatus comprising:

a plurality of telescoping arms coupled to the roof rack by a plurality of mounting brackets and oriented substantially perpendicular to a longitudinal axis of the vehicle, the plurality of telescoping arms comprising a first telescoping arm situated proximate the front edge of the roof, a second telescoping arm situated in an intermediate portion of the roof, and a third telescoping arm situated proximate the rear edge of the roof, each telescoping arm of the first, second and third telescoping arms comprising an outer tubular member coupled to the roof rack and an inner tubular member slidably mounted to the outer tubular member, each inner tubular member of the first, second and third telescoping arms configured to slidably adjust to an extended position into the side area of the vehicle or a retracted position within the outer tubular member, each mounting bracket in the plurality of mounting brackets comprising an upper opening configured to receive one of the plurality of crossing bars therethrough and a bottom opening configured to receive one of the outer tubular members of the plurality of telescoping arms therethrough;

a support bar coupled to exposed ends of the inner tubular members of the plurality of telescoping arms, and a canopy disposed on the second telescoping arm in the extended position and detachably coupled to the support bar, roof rack of the vehicle, and first and third telescoping arms in the extended position, the canopy comprising a top edge, a bottom edge opposite the top edge and a pair of side edges coupled to the top and bottom edges, the top edge of the canopy coupled to the inner tubular member of the first telescoping arm, the bottom edge of the canopy coupled to the inner tubular member of the third telescoping arm, the first side edge of the canopy coupled to the support bar, and the second side edge of the canopy coupled to one of the pair of side bar assemblies in the roof rack, thereby securing the canopy in place over the side area of the vehicle.

\* \* \* \* \*